(12) United States Patent
Saavedra Rubilar et al.

(10) Patent No.: US 10,891,716 B2
(45) Date of Patent: Jan. 12, 2021

(54) PROCESS ALLOWING THE REMOVAL THROUGH DIGITAL REFOCUSING OF FIXED-PATTERN NOISE IN EFFECTIVE IMAGES FORMED BY ELECTROMAGNETIC SENSOR ARRAYS IN A LIGHT FIELD

(71) Applicant: UNIVERSIDAD DE CONCEPCION, Concepcion (CL)

(72) Inventors: Carlos Saavedra Rubilar, Concepcion (CL); Sergio Neftali Torres Inostroza, Concepcion (CL); Pablo Antonio Coelho Caro, Concepcion (CL); Jorge Eduardo Tapia Farias, Concepcion (CL); Francisco German Perez Venegas, Concepcion (CL)

(73) Assignee: UNIVERSIDAD DE CONCEPCION, Concepcion (CL)

( * ) Notice: Subject to any disclaimer, the term of this patent is extended or adjusted under 35 U.S.C. 154(b) by 149 days.

(21) Appl. No.: 15/780,135

(22) PCT Filed: Aug. 25, 2016

(86) PCT No.: PCT/CL2016/000049
§ 371 (c)(1),
(2) Date: May 30, 2018

(87) PCT Pub. No.: WO2017/091914
PCT Pub. Date: Jun. 8, 2017

(65) Prior Publication Data
US 2018/0365806 A1    Dec. 20, 2018

(30) Foreign Application Priority Data
Nov. 30, 2015  (CL) .................................. 3495-2015

(51) Int. Cl.
*G06K 9/40*        (2006.01)
*G06T 5/00*        (2006.01)
(Continued)

(52) U.S. Cl.
CPC ................ *G06T 5/002* (2013.01); *G06T 5/10* (2013.01); *G06T 7/557* (2017.01); *H04N 5/365* (2013.01);
(Continued)

(58) Field of Classification Search
CPC  G06T 5/002; G06T 5/10; G06T 7/557; G06T 2207/20182; G06T 2207/10052; G06T 2207/10048; H04N 5/365
(Continued)

(56) References Cited

U.S. PATENT DOCUMENTS

| 4,602,291 A | 7/1986 | Temes |
| 5,047,861 A | 9/1991 | Houchin et al. |

(Continued)

FOREIGN PATENT DOCUMENTS

| JP | 2009303196 A | 12/2009 |
| JP | 2014090401 A | 5/2014 |

OTHER PUBLICATIONS

J. Fiss, B. Curless and R. Szeliski, "Refocusing plenoptic images using depth-adaptive splatting," 2014 IEEE International Conference on Computational Photography (ICCP), Santa Clara, CA, 2014, pp. 1-9, doi: 10.1109/ICCPHOT.2014.6831809 (Year: 2014).*
(Continued)

*Primary Examiner* — Andrew M Moyer
(74) *Attorney, Agent, or Firm* — Lucas & Mercanti, LLP

(57) ABSTRACT

A process that allows the removal of fixed-pattern noise in effective images formed by electromagnetic sensor arrays in a light field, which includes at least the following steps: (a) The formation of a digital image from an electromagnetic
(Continued)

(a)

(b)

sensor array; (b) the formation of a light field that must have at least 2×2 digital images of a scene, with a separation distance of at least the size of the effective area of an electromagnetic sensor; and (c) the reconstruction of an image by means of digital refocusing from the light field.

3 Claims, 4 Drawing Sheets

(51) Int. Cl.
  *H04N 5/365* (2011.01)
  *G06T 7/557* (2017.01)
  *G06T 5/10* (2006.01)
(52) U.S. Cl.
  CPC .............. *G06T 2207/10048* (2013.01); *G06T 2207/10052* (2013.01); *G06T 2207/20182* (2013.01)
(58) Field of Classification Search
  USPC ........................................................ 382/255
  See application file for complete search history.

(56) References Cited

U.S. PATENT DOCUMENTS

| | | | |
|---|---|---|---|
| 5,811,808 A | 9/1998 | Cannata et al. | |
| 6,097,394 A | 8/2000 | Levoy et al. | |
| 6,591,021 B1 | 7/2003 | Breiter et al. | |
| 7,235,773 B1 | 6/2007 | Newman | |
| 7,391,447 B2 * | 6/2008 | Lee | H04N 5/2259 348/219.1 |
| 7,949,252 B1 | 5/2011 | Georgiev | |
| 8,208,755 B1 | 6/2012 | Hogasten | |
| 8,619,177 B2 | 12/2013 | Perwass et al. | |
| 2006/0098107 A1 * | 5/2006 | Lee | H04N 5/2259 348/241 |
| 2007/0252074 A1 | 11/2007 | Ng et al. | |
| 2010/0026852 A1 | 2/2010 | Ng et al. | |
| 2010/0141802 A1 | 6/2010 | Knight et al. | |
| 2010/0265386 A1 | 10/2010 | Raskar et al. | |
| 2012/0199689 A1 | 8/2012 | Burkland | |
| 2012/0229682 A1 | 9/2012 | Ng et al. | |
| 2012/0327222 A1 | 12/2012 | Ng et al. | |
| 2013/0128087 A1 * | 5/2013 | Georgiev | G06T 3/4053 348/307 |
| 2014/0098213 A1 * | 4/2014 | Sato | G02B 21/367 348/79 |
| 2014/0146201 A1 * | 5/2014 | Knight | H04N 9/04 348/231.99 |

OTHER PUBLICATIONS

R. Ng; Fourier Slice Photography; ACM Transactions on Graphics (TOG)—Proceedings of ACM Siggraph 2005; vol. 24; Jul. 2005; pp. 735-744 (not available).

International Search Report dated Dec. 7, 2016 for PCT/CL2016/000049 and English translation.

R. Ng; Fourier Slice Photography; ACM Transactions on Graphics (TOG)—Proceedings of ACM Siggraph 2005; vol. 24; Jul. 2005; pp. 735-744.

* cited by examiner

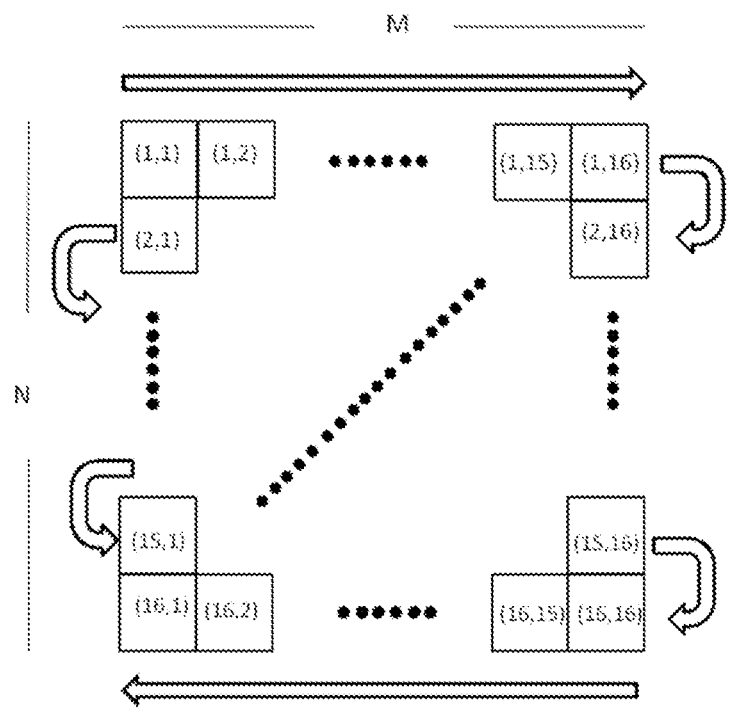
Figura 4
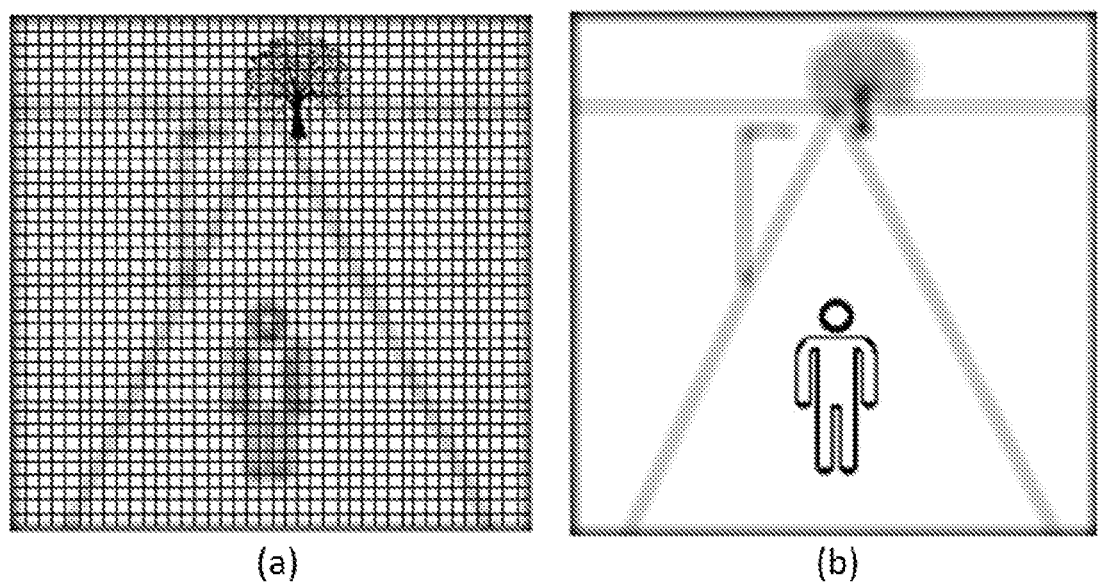
Figure 5

PROCESS ALLOWING THE REMOVAL THROUGH DIGITAL REFOCUSING OF FIXED-PATTERN NOISE IN EFFECTIVE IMAGES FORMED BY ELECTROMAGNETIC SENSOR ARRAYS IN A LIGHT FIELD

CROSS REFERENCE TO RELATED APPLICATION

This Application is a 371 of PCT/CL2016/000049 filed on Aug. 25, 2016, which claims priority of Chilean Application No. 3495-2015 filed Nov. 30, 2015, both of which are incorporated herein by reference.

TECHNICAL SECTOR

This invention can be applied in the fields of astronomy, thermography, microscopy and tomography, in industrial and military vision systems and, in general, in any digital imaging system. Specifically, it is a process that allows the removal of fixed-pattern noise in effective images formed by electromagnetic sensor arrays in a light field

PRIOR ART

Digital image-forming systems based on electromagnetic sensor arrays are used in scientific, commercial, industrial, and private applications, the quality of the images being the determining factor in the selection of those systems.

One of the disadvantages of this type of system is a distortion produced in the digital images known as fixed-pattern noise. This distortion is inherent to the functioning of these systems and reduces the quality of the digital images through an alteration in their readings, which are non-uniform even when the electromagnetic radiation received by the electromagnetic sensor array is perfectly uniform. This non-uniformity in the sensors is a consequence of their construction, since it has so far been impossible to produce identical detector arrays, with the result that all image-forming systems are non-uniform. This leads to a loss of quality in that the digital image does not correspond exactly to the scene observed by the image-forming system. Thus the removal of fixed-pattern noise is essential to ensure the quality of readings and therefore the quality of the scene.

In the past, the proposed solution to improve digital image quality with regard to fixed-pattern noise has been technology and dependent application. However, no general definitive solution has been found, since fixed-pattern noise varies in time according to the type of detector and conditions such as the temperature of the electromagnetic sensor array operation and the radiation intensity of the scene observed.

Proposed solutions can be classified into two main groups: the first uses calibration techniques based on the measurements of benchmarks that require additional equipment and also need to be updated regularly. This creates another problem, because while the benchmark is being generated it is necessary to stop observing the scene. The second group employs processing techniques for digital images based on scene characteristics. These partially remove the fixed-pattern noise but introduce another distortion known as ghosting.

In practice, the solutions are embedded in the electronic systems associated with electromagnetic sensor arrays.

The main patent documents relating to this technology are described as follows:

1. Patent application US 2012/0199689 (Burkland), "Infrared spatial modulator for scene-based non-uniformity image correction and systems and methods related thereto", describes an infrared spectrum modulator capable of carrying out non-uniformity image correction in infrared thermal sensors oriented at projectile guidance systems using infrared thermal radiation. It also includes a method for incorporating said correction into the flight procedure and target search of these projectiles, where, in a preferred application, the space modulator is used to change the source of radiation influencing an infrared sensor array, so as to be able to obtain information both of the objective scene and of the intensities of blackbody references, in order to then calculate the non-uniformity parameters and produce a spatially corrected image. The non-uniformity parameters are determined using a mathematical procedure known as two-point calibration.

2. U.S. Pat. No. 4,602,291 (Temes), "Pixel non-uniformity correction system", protects a system correcting non-uniformity in solid-state image sensors that operates in three separate cycles determined by a circuit breaker. These cycles combine two modes, allowing an estimation of the non-uniformity parameters of the sensor, with a third mode for the normal detection operation. Specifically, in the first mode the dark-current level is measured in the absence of a light source and digitally stored. In the second mode, the gain is measured with a uniform illumination source, subtracted from the dark-current level and also digitally stored. Finally, the third mode involves detection through normal camera operation and includes linear correction in the sensor, according to the previously calculated dark-current and gain values.

3. U.S. Pat. No. 5,047,861 (Houchin et al.), "Method and apparatus for pixel non-uniformity correction", protects a method and apparatus for correcting non-uniformity in image sensors. The operating method comprises two modes, one with calibration and the other corresponding to normal operation. The apparatus is characterized by its use of a lookup chart with digital data that in calibration mode stores both the values of non-uniformity parameters and gamma correction and others. This avoids the need for non-uniformity correction estimates in the normal operating mode, which is to say that it avoids adding and multiplying signal intensity values. Instead, according to the digital values of the input signal it conducts a search in charts that digitally store the pre-calculated values with corrections included for the values of the input signal.

4. U.S. Pat. No. 5,811,808 (Cannata et al.), "Infrared imaging system employing on-focal plane nonuniformity correction", divulges an infrared detection system and imaging systems in which it is possible to reduce the presence of offset non-uniformity in infrared imaging systems using sensors in a focal plane array.

5. U.S. Pat. No. 6,591,021 (Breiter et al.), "Method and apparatus for correcting the gray levels of images of a digital infrared camera", describes a method and apparatus for non-uniformity correction in the grey levels of digital camera images. To this purpose, the apparatus includes a digital memory section that stores the non-uniformity coefficients for each of the sensor detectors, these coefficients being updated dynamically.

6. U.S. Pat. No. 7,235,773 (Newman), "Method and apparatus for image signal compensation of dark current, focal plane temperature, and electronics temperature", protects a system and method of calibration and compensation for a visual sensor system, in which image compensation is carried out to remove the effects of dark current, focal plane temperature and electronic temperature in a CCD active pixel sensor array. The visual calibration method of the sensor has a predetermined minimum-maximum range according to the exposure of the sensor, focal plane temperature and electronic temperature, so as to generate image compensation coefficients related to the response values of the image obtained for each of the predetermined values.

7. U.S. Pat. No. 8,208,755 (Hogasten), "Scene based non-uniformity correction systems and methods", divulges methods and systems capable of correcting non-uniformity in infrared image sensors constituted by individual sensor pluralities. The main purpose of all the methods described is the estimation of movement between image frames in order to calculate offset non-uniformity. The systems described in the patent incorporate this central idea in different ways, creating variants that use the whole array of detectors or only some of them, processing the images inside the chip or utilizing memories that can be read by the computer, among others.

8. U.S. Pat. No. 8,619,177 (Perwass et al.), "Digital imaging system, plenoptic optical device and image data processing method", describes a digital imaging system configured to synthesize images from a plenoptic optical device consisting of a photosensor matrix with a plurality of photosensors, arranged on a predetermined image plane, and a microlens matrix with a plurality of microlenses arranged to direct the light from an object to the photosensor array, in which the photosensor array and the microlens array are placed at a predetermined distance. The microlenses have different focal lengths that vary on the microlens matrix, and the image plane of the photosensor array is arranged in such a way that the distance between the photosensor array and the microlens array is not equal to the focal lengths of the microlenses. In addition, this patent protects a plenoptic optical device including the digital imaging system and a method of processing image data collected through the digital imaging system.

9. U.S. Pat. No. 7,949,252 (Georgiev), "Plenoptic camera with large depth of field", protects a method and a camera to capture a light field with large depth of field. It describes the relation between the parameters of a plenoptic camera, including magnification, f-number, focal length, wavelength, and pixel size, all of which can be analyzed to design plenoptic cameras that provide an increase in field depth in comparison with conventional plenoptic cameras. The plenoptic cameras can be implemented according to the method, and the image formation of a Galilean or Keplerian telescope can be used at the same time, whilst they provide larger depth of field than that produced by conventional plenoptic cameras. In this way, they capture light field images that include both sides, in which everything except a small region of the scene is in focus.

10. Patent application US 2007/0252074 (Ng et al.), "Imaging arrangements and methods therefor", divulges a system and method of acquisition of images to facilitate focusing or optical correction in which a preferred application of the system is an imaging arrangement that collects information about light passing through a particular focal plane. The light data is collected using an approach that facilitates the determination of the direction from which different portions of the incident light emanate onto a portion of the focal plane. This directional information in relation to the level of light detected by the photosensors is used to selectively focus and/or correct an image represented by the light.

11. Patent application US 2010/0141802 (Knight et al.), "Light field data acquisition devices, and methods of using and manufacturing same", divulges a light field data acquisition device that includes the optics and a sensor to acquire data from the light field image of a scene. In at least one design, the sensor is in a fixed position, with a predetermined location in relation to the optical focal point. The device determines a first virtual depth of focus different from an optical depth of focus of the light field image, and automatically generates and emits the representative data from a first image of a scene in the first virtual depth of focus. In response to user entry the device determines a second virtual depth of focus and generates representative data from a second image of the scene in the second virtual depth of focus.

12. Patent application US 2012/0229682 (Ng et al.), "Correction of optical aberrations", presents a method for correcting aberrations in digital images using a device consisting of an imaging array implemented through a microlens array that directs light to a photosensor that detects light. The information generated is used to calculate an output image in which each pixel value corresponds to a selective weighting and summation of a subset of values detected by the photosensor. The weighting function is a function of the imaging array characteristics. In some applications, this function reduces the delivery of data from photosensors that contribute high amounts of optical aberration to the corresponding output image pixel.

13. Patent application US 2012/0327222 (Ng et al.), "Light field data acquisition", describes a light field data acquisition device that includes optical sensors and a light field sensor for acquiring light field image data from a scene. In a preferred application, the light field sensor is in a fixed location, a predetermined relative distance from the optical focal point. In response to user entry, the light field acquires the light field image information from the scene, and a storage device keeps the acquired data, which can be used later to generate a large number of images of the scene using different depths of virtual focus.

14. Patent application US 2010/0026852 (Ng et al.), "Variable imaging arrangements and methods therefor", protects a digital imaging system for processing useful data to synthesize an image of a scene. Varying approaches to imaging include the selection of directional and spatial resolution. In a preferred application of the system, the images are calculated using an imaging array that facilitates the selection of directional and spatial aspects of detection and the processing of light data. The light passes through a main lens and is directed to the photosensors by means of a great number of microlenses. The separation distance between microlenses and photosensors is selected so as to aid directional and spatial resolution in the captured light data, facilitating the power of image refocusing or resolution in images calculated from captured light data.

15. U.S. Pat. No. 6,097,394 (Levoy et al.), "Method and system for light field rendering", describes a simple and robust method in addition to a system for generating new views from arbitrary camera positions without depth information or matching characteristics, simply by combining and resampling the available images. This technique interprets input images as two-dimensional slices of a four-dimensional function, the light field. This function completely characterizes the light flow through the free space in a static scene with fixed illumination. The light field can be created from big digital image arrays acquired with a video camera mounted on a computer-controlled gate. Once the light field has been created, new views can be reconstructed in real time by extracting the cuts or slices in appropriate directions. A compression system capable of compressing light fields generated by a 100:1 factor with very little loss of fidelity is also described.

16. Patent application US 2010/0265386 (Raskar et al.), "4D light field cameras", presents a camera that acquires a 4D light field of a scene. The camera includes a lens and a sensor. A mask is positioned on a straight optical path between the lens and the sensor. The mask includes an attenuation pattern to spatially modulate the 4D light field acquired from the scene by means of the sensor. The pattern has a low spatial frequency when the mask is placed near the lens and high spatial frequencies when the mask is placed near the sensor.

Taking into account the above background information and the great utility at the present time of digital imaging systems based on electromagnetic sensor arrays, there is a clear need to develop alternative processes that make it possible to compensate effectively for the fixed-pattern noise in these systems.

BRIEF DESCRIPTION OF THE FIGURES

FIG. 4: Corresponds to the sequence of the light field image-capturing process.

FIG. 5: Corresponds to a representation of the result of fixed-pattern noise removal, obtained by refocusing a focal plane at optical infinity and on a near focal plane of the scene

DISCLOSURE OF THE INVENTION

This technology consists of a process that allows the removal through digital refocusing of fixed-pattern noise in effective images formed by electromagnetic sensor arrays in a light field. The noise reduction level depends on the refocusing plane and is independent of the architecture of the sensor data reader.

This innovation can preferably be applied in the fields of astronomy, thermography, microscopy, tomography, in industrial and military vision systems and, in general, in any digital imaging system. This great applicability versatility is based on the fact that in order to form a digital image it is necessary to create an electromagnetic sensor array consisting of multiple non-uniform units capable of measuring electromagnetic radiation in any region of the electromagnetic spectrum, thus defining the technology to be used and its application. For example, if the electromagnetic spectrum of visible wave lengths needs to be measured and the scene is captured with low levels of illumination, fixed-pattern noise effects appear, so that this technology can be applied to remove noise from images in the visible spectrum. Additionally, if there is a need to detect the temperature of the same scene, it is necessary to measure in the electromagnetic spectrum of the infrared wave length. To this purpose, a detector of microbolometers can be used, as they also present severe fixed-pattern noise, and thus this technology is also applicable in the field of thermography. Although these two regions of the spectrum are different, they are linked at the core, since electromagnetic radiation is detected using electromagnetic sensor arrays arranged in any geometry with the capability of forming digital images and, as previously mentioned, these sensors present fixed-pattern noise.

The procedure that allows the removal of fixed-pattern noise by digitally refocusing the effective images formed by electromagnetic sensor arrays comprises at least the following steps:

A. The formation of a digital image from an electromagnetic sensor array;

B. the formation of a light field; and

C. the reconstruction of an image by means of digital refocusing from the light field.

Figure 1:
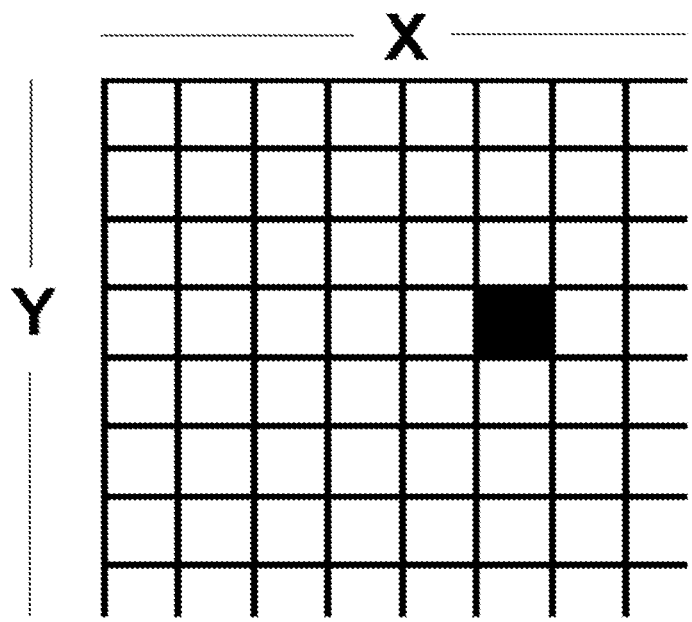
FIG. 1: Corresponds to a matrix to which intensity values are assigned, which is termed an image.

These steps are described in detail in the following section:

Step A: As shown in FIG. 1, the objective is to assign intensity information coming from an electronic sensor array to each element of a matrix. In this rectangular geometric arrangement the xy coordinates are assigned to each sensor. This complete matrix is what is called a digital image.

Figure 2:
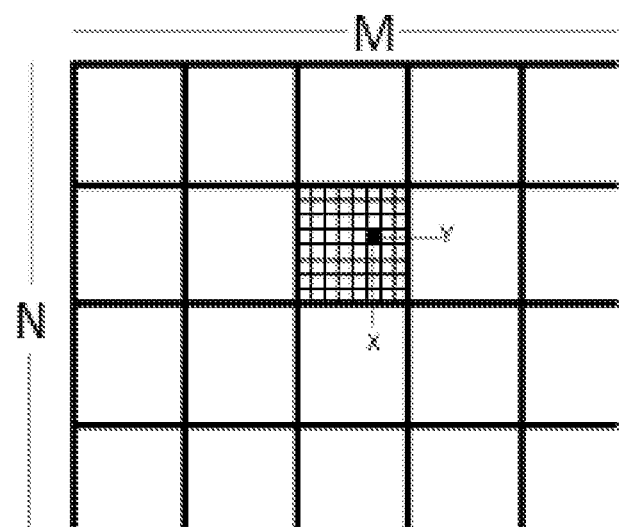
FIG. 2: Corresponds to a light field provided in its interior with a stored digital image.

Step B: The objective is to complete the light field information, which is defined as an image matrix. This light field must have at least 2×2 digital images of a scene, with a separation distance of at least the size of the effective area of an electromagnetic sensor. FIG. 2 shows the light field, inside which can be seen a stored digital image, its geometric order being represented by the coordinates MN. The mathematical expression of this light field is a 4-dimensional function $C_L$ (x, y, m n) thus the electromagnetic sensor represented by a black element in FIG. 2 has a coordinate in the light field of $C_L$ (6, 4, 3, 2) and the complete digital image containing it is represented by $C_L$ (x, y, 3, 2).

The manner of construction of a light field is not unique and at least three architectures can be mentioned:

For a single electromagnetic sensor array with its electromagnetic radiation focusing system and spatial displacement.

For multiple electromagnetic sensor arrays, distributed over different positions, each array with its own electromagnetic radiation focusing system.

For a single electromagnetic sensor array and multiple electromagnetic radiation focusing systems.

Step C: The objective of this step is to form an image refocused digitally from a light field on any near focal plane by means of a digital focus control algorithm on the Fourier plane.

The digital refocusing effect resulting from this technology makes it possible to progressively remove the noise as the focal planes approach the observer. The focal plane at infinity contains all the fixed-pattern noise and the objects are maximally contaminated by this superimposed noise, where the actual distance at which the focal plane at optical infinity is found is relative, since for a microscope system this distance could be 1 cm and for a telescope it could be a number of light years. As nearer focal planes are selected, the effective digital image progressively contains lower levels of fixed-pattern noise, until very near planes in the foreground of the scene make it possible to recuperate a refocused image with total removal of fixed-pattern noise, it being understood that a near focal plane is any focal plane that approaches the observer from the focal plane representing infinity.

Thus, the application of this technology allows fixed-pattern noise removal levels to be defined. For example, two zones of fixed-pattern noise can be established: one zone of high noise removal (near focal plane range) and a noisy zone (distant focal plane range). Given that the criterion of what is considered acceptable noise removal varies with the context of the application, the definition of noise removal zones depends on the particular situation in which the technology is applied, so that higher levels of noise removal may be established. This means that the final output image does not have a metric universally defining the quality, since the quality desired for the output image varies according to the context of the application.

What mainly differentiates this technology from others is the fact that there is no need to know the physical parameters of the electromagnetic sensor used in the formation of the light field in order to recuperate digital images from which fixed-pattern noise has been removed. This key characteristic gives great flexibility to the application of the technology and it also represents a crucial advantage in that, in general, proposals relating to fixed-pattern removal require such parameters.

To summarize, this technology corresponds to a procedure that allows the progressive removal of fixed-pattern noise by digitally refocusing images formed by electromagnetic sensor arrays.

APPLICATION EXAMPLE

Figure 3:
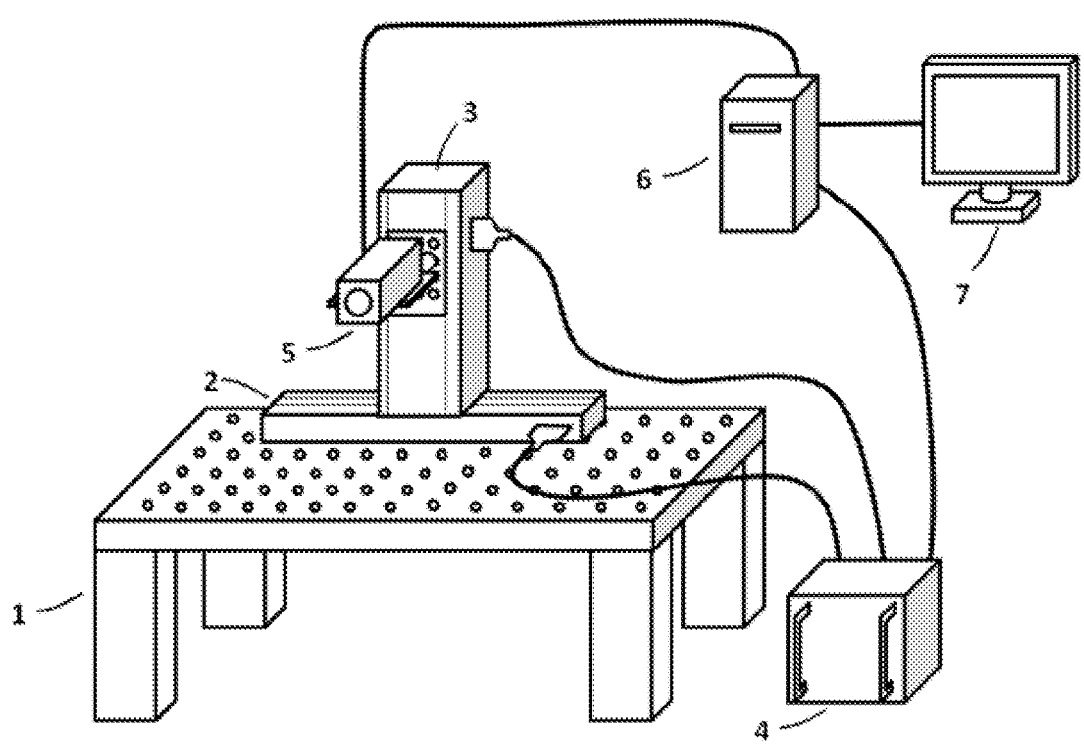
FIG. 3: Corresponds to the schema of a mechanical/optical/electronic system for image acquisition with its different components.

Example 1.—Evaluation of the Process of Fixed-Pattern Noise Removal in a Mechanical/Optical/Electronic Thermal Imaging System in the Electromagnetic Spectrum of the Far Infrared The progressive fixed-pattern noise removal process was implemented in a mechanical/optical/electronic system that captures thermal information from a scene with industrial elements at different temperatures, the images formed by electromagnetic sensor arrays being refocused digitally on different planes. FIG. 3 presents a schema of the system with its different components, described as follows:
 a. A level bank (1);
 b. a high precision linear translation base (2) with a displacement range of 600 mm with a DC motor and rotary encoder (Model: IMS600CC, Newport);
 c. a high precision vertical translation base (3) with a displacement range of 300 mm with a DC motor (IMS-V Series, Model: IMS300V, Newport) mounted on a right angle bracket (Model: EQ120, Newport);
 d. a 2-axis universal controller with ethernet connection (4) (Model: XPS-Q2, Newport) to control the vertical and horizontal translation base;
 e. an infrared camera (5) with a focal plane array of highly sensitive microbolometers that form a matrix of 320×240 pixels and detect electromagnetic radiation in a wave length range of 8 to 12 μm. For image forming it uses a lens with a focal distance f=24 mm and F-number F=1.1;
 f. a CPU (6) with ethernet for the connection and control of the 2-axis universal controller and camera; and
 g. a screen (7) for displaying the control interface of the 2-axis universal controller and camera.

This system allows the acquisition of images in the infrared wave length spectrum in which fixed-pattern noise is a problem. Using the arrangement and functioning of the different parts of the system together, the light field $C_L(x,y,m,n)$ was completed for further processing with an algorithm that analyzed the information in the frequency domain. Through the selective extraction of this information from the frequency domain by means of a focal selector, it was possible to reconstruct images focused digitally on different planes of the scene of interest. This digital focus process led to the progressive removal of fixed-pattern noise in the refocused digital images as the scene planes came increasingly nearer.

The following section describes the process for progressively removing fixed-pattern noise by digitally refocusing images formed by electromagnetic sensor arrays.

Step A:

The electromagnetic sensors selected for this example functioned in a wave length of 8-12 μm, which corresponds to the wave length of far infrared. The electromagnetic sensors were geometrically arranged on an array forming a matrix of 320×240 xy positions. Each of these sensors was produced through microbolometer technology. The assembly formed by the microbolometer matrix attached to a single main lens was named the infrared digital camera or simply the camera, and the capture of intensities of an optical scene formed on this electronic sensor array was named the digital image. Every digital image acquired by the camera was contaminated by fixed-pattern noise particular to this type of technology and defined principally through the manufacture of the sensor array.

Step B:

The architecture for completing the light field was a single electromagnetic sensor array with its electromagnetic radiation focal system and discrete transverse spatial displacements.

To complete the light field $C_L(x,y,m,n)$, the MN coordinates were determined, defined as a square matrix of 16×16 digital images. The displacement between the MN coordinates of light field $C_L(x,y,m,n)$ was defined as d=15 mm and was equal in the vertical and horizontal directions. With the aim of automatically acquiring a digital image associated with each MN coordinate, first a camera (1) was mounted on a horizontal (2) and vertical (3) translation system. To automate the camera (1) positioning process in each MN coordinate and the capture of a digital image in each of these coordinates, an automation program was performed that stayed in the CPU (6), displaying its user interface on the screen (7). The automation program for positioning and digital image capture received as input parameters the displacement d=15 mm between MN coordinates and the matrix size to cover, in this case 16×16 MN positions.

The sequencing of the light field $C_L(x,y,m,n)$ image capture process was carried out by sweeping the camera position for each MN position; that is, beginning in one position (1.1), the camera moved automatically for each position forming the MN 16×16 matrix positions, so that in each position a digital image was automatically captured. The displacement of the acquisition and the automatic capture were performed by starting at the point of departure (1.1) of the MN matrix, to then advance through all the columns of the row to (1.16). When the camera reached this point, it moved down to the following row and moved in the opposite direction. This change of direction was repeated at the end of every row until all the matrix positions were covered, as shown in FIG. 4.

Step C:

The reconstruction of an image was performed by digital refocusing based on an algorithm known as the Fourier Slice Photography Theorem. This algorithm converts the spatial information of the light field (x,y,m,n) to information in frequency space through the application of a Fourier transform in four dimensions. From the frequency space a selective extraction of information was performed by means of a frequency cut-off and a subsequent change of base dependent on a focusing parameter called a, which acted as a focusing plane selector for observing the scene.

A two-dimensional inverse Fourier transform was applied to each extraction of information determined by a (an effective image focused on a determined object plane) and it was possible to reconstruct an image refocused on a specific plane of the scene associated with a specific a. The plane selection considered that a parameter α=0 defined the reconstruction of an image focused on objects at optical infinity, and a parameter a with increasing values extracted an image refocused on increasingly nearer planes, allowing the progressive removal of fixed-pattern noise.

This process generated the output of an image refocused digitally for objects in the scene on a focal plane of 3 [m], which was a near focal plane in respect of the depth of the scene of interest, and in whose refocused image the fixed-pattern noise was surprisingly no longer visible. FIG. 5 schematizes the results presented in two refocus planes. Specifically FIG. 5(*a*) presents the refocus on the far plane, corresponding to the optical infinity of the scene, in which it can be seen that all the fixed-pattern noise was superimposed on the image. In contrast, FIG. 5(*b*) presents the refocus on a near focal plane of the scene, where the fixed-pattern noise was no longer perceptible in the image and the object of this plane was perfectly focused.

Figure 6:
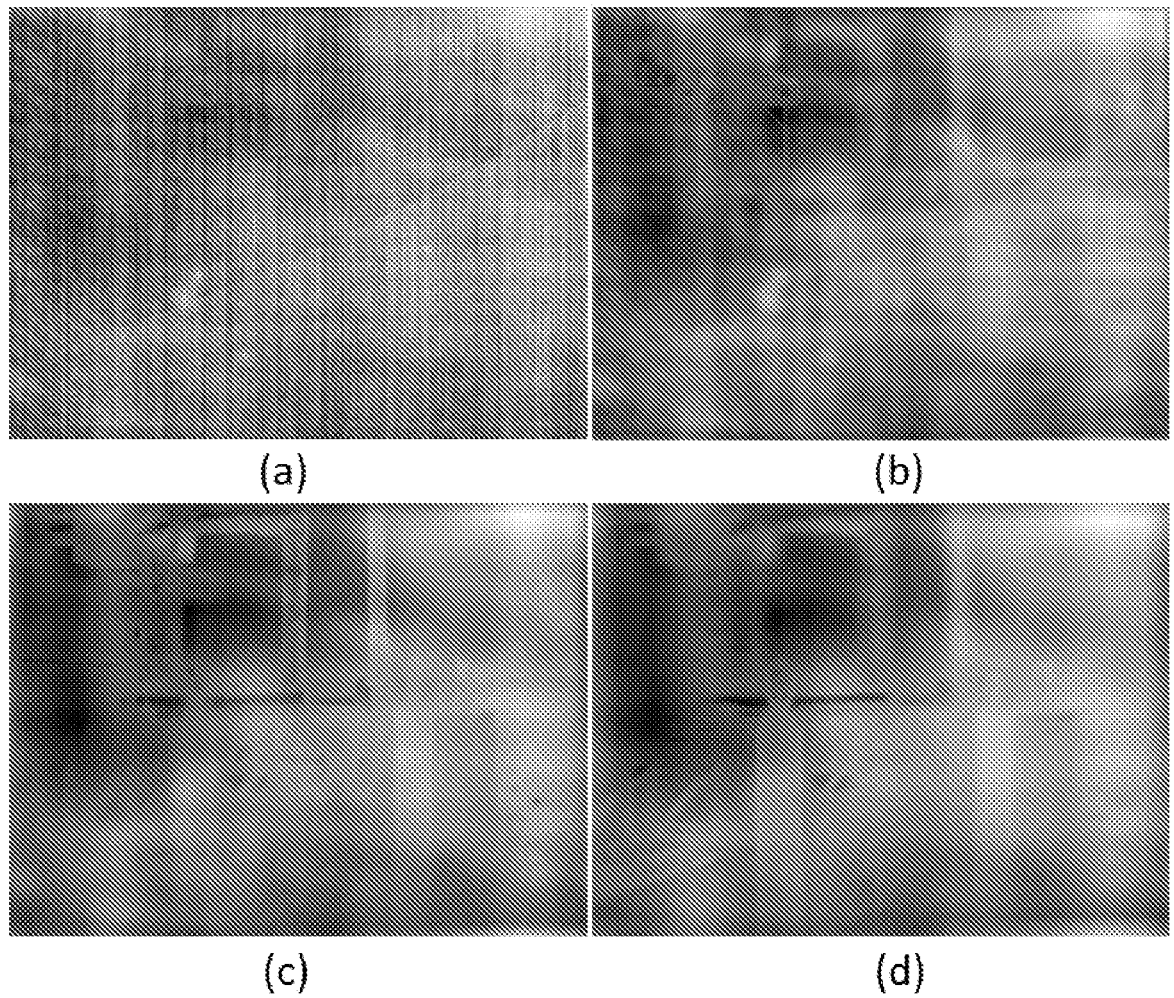
FIG. 6: Corresponds to images of actual results of fixed-pattern noise removal, obtained by refocusing different planes of the image of the scene.

FIG. 6 presents actual thermal images of the industrial scene with elements at different temperatures, which are the result of the use of the process allowing progressive fixed-pattern noise removal by digitally refocusing images formed by electromagnetic sensor arrays. Specifically, FIG. 6(*a*) shows the result of refocusing objects at the optical infinity of the scene, where the refocus parameter corresponded to α=0 at an approximate distance of 30 [m]. The objects could not be clearly visualized, because the fixed-pattern noise behaved like an optical object at infinity and superimposed itself severely on the scene. FIG. 6(*b*) shows a refocus on an intermediate plane of the scene, which corresponded to α=58 at an approximate distance of 20 [m]. In this case, it can be plainly seen that the fixed-pattern noise was beginning to blur and the objects of the scene corresponding to this focal plane were visualized more clearly. FIG. 6(*c*) shows another intermediate focal plane of the scene, which corresponded to α=120 at an approximate distance of 10 [m]. In this case, it can already be clearly seen that fixed-pattern noise has been completely removed. Finally, FIG. 6(*d*) shows refocusing on a plane in the foreground of the scene, which corresponds to α=181 at an approximate distance of 3 [m] and fixed-pattern noise removal is seen to be complete for the near object, namely gas cylinders, making it possible to see temperature differences in great detail. These images were captured in the far infrared and are a visual representation of the temperature of the objects. All of the above was the result of the process to progressively remove fixed-pattern noise by digitally refocusing images formed by electromagnetic sensor arrays.

The invention claimed is:

1. A process for removal of fixed-pattern noise in images formed by electromagnetic sensor arrays in a light field, comprising the following steps:
   a. forming a digital image from an electromagnetic sensor array;
   b. forming a light field defined as an image matrix having a plurality of at least 2×2 digital images of a scene, wherein each digital image of the matrix has a separation distance of at least a size of an effective area of an electromagnetic sensor which is built up through a single array of electromagnetic sensors and multiple focusing systems of electromagnetic radiation; and
   c. reconstructing an image by means of digital refocusing from the light field on two different refocus planes, a first plane being a near focal plane and a second plane being a far plane corresponding to an infinity, and by converting spatial information of the light field to information in frequency space using a digital refocusing algorithm where noise is progressively eliminated as the refocus planes are brought closer together with respect to an observer.

2. The process for removal of fixed-pattern noise in effective images formed by electromagnetic sensor arrays in a light field, according to claim 1, wherein step (a) is assigned to each element of a rectangular matrix, the intensity coming from an electromagnetic sensor array and an xy coordinates being established for each sensor.

3. The process for removal of fixed-pattern noise in effective images formed by electromagnetic sensor arrays in a light field according to claim 1, wherein step (b) the single electromagnetic sensor array further comprises transverse spatial displacements.

\* \* \* \* \*